(12) United States Patent
Grosser et al.

(10) Patent No.: US 8,705,532 B2
(45) Date of Patent: Apr. 22, 2014

(54) METHODS, SYSTEMS, AND COMPUTER PROGRAM PRODUCTS FOR SELECTIVE LAYER 2 PORT BLOCKING USING LAYER 2 SOURCE ADDRESSES

(75) Inventors: Donald B. Grosser, Apex, NC (US); Daniel V. Wade, Pleasanton, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1328 days.

(21) Appl. No.: 11/356,614

(22) Filed: Feb. 17, 2006

(65) Prior Publication Data
US 2007/0195793 A1 Aug. 23, 2007

(51) Int. Cl.
*H04L 12/56* (2011.01)
*H04L 29/06* (2006.01)
*H04L 12/00* (2006.01)
*H04L 12/46* (2006.01)

(52) U.S. Cl.
CPC .......... *H04L 45/745* (2013.01); *H04L 63/0236* (2013.01); *H04L 12/4641* (2013.01)
USPC .......... 370/392; 370/389; 370/395.53; 726/3; 726/11; 726/13

(58) Field of Classification Search
CPC ..................... H04L 45/745; H04L 63/0236
USPC .............. 370/395.53, 389, 392; 726/3, 11, 13
See application file for complete search history.

(56) References Cited

U.S. PATENT DOCUMENTS

| | | | |
|---|---|---|---|
| 6,977,891 B1 | 12/2005 | Ranjan et al. | |
| 7,031,325 B1 * | 4/2006 | Williams | 370/401 |
| 7,139,269 B2 * | 11/2006 | Kalkunte et al. | 370/389 |
| 7,620,043 B2 * | 11/2009 | Wang et al. | 370/389 |
| 7,756,126 B2 * | 7/2010 | Iyer et al. | 370/389 |
| 2002/0034187 A1 * | 3/2002 | Kalkunte et al. | 370/401 |
| 2002/0037006 A1 | 3/2002 | Sampath | |
| 2002/0191558 A1 * | 12/2002 | Agrawal et al. | 370/329 |
| 2003/0174711 A1 * | 9/2003 | Shankar | 370/395.53 |
| 2004/0170176 A1 * | 9/2004 | Kadambi et al. | 370/392 |
| 2004/0205000 A1 * | 10/2004 | Lund | 705/21 |
| 2005/0055570 A1 | 3/2005 | Kwan et al. | |

(Continued)

FOREIGN PATENT DOCUMENTS

| | | |
|---|---|---|
| CN | 101433029 | 2/2013 |
| EP | 1 985 074 B1 | 4/2013 |
| JP | 4903231 | 1/2012 |

OTHER PUBLICATIONS

Declaration of Donald B. Grosser and attached correspondence (Sep. 2007).

(Continued)

*Primary Examiner* — Ayaz Sheikh
*Assistant Examiner* — Tarell Hampton
(74) *Attorney, Agent, or Firm* — Jenkins, Wilson, Taylor & Hunt, P.A.

(57) ABSTRACT

Methods, systems, and computer program products for selective layer 2 port blocking using layer 2 source addresses are disclosed. According to one method, a layer 2 frame is received. An I/O port block list is identified based on a layer 2 source address in the layer 2 frame. A set of ports to which the layer 2 fame should be forwarded is identified. The frame is blocked from being forwarded to ports in the set that are also in the I/O port block list.

22 Claims, 3 Drawing Sheets

(56) References Cited

U.S. PATENT DOCUMENTS

2005/0125418 A1* 6/2005 Brewer et al. .................. 707/10
2005/0259589 A1* 11/2005 Rozmovits et al. ........... 370/249
2005/0286537 A1* 12/2005 Shimada .................. 370/395.53
2006/0251065 A1* 11/2006 Hamamoto et al. .......... 370/389

OTHER PUBLICATIONS

Notification of Transmittal of the International Search Report and the Written Opinion of the International Searching Authority, or the Declaration for International Application No. PCT/US07/03081 (Mar. 20, 2008).

Japanese Official Action for Japanese Patent Application No. 2008-555265 (Mar. 28, 2011).

Chinese Official Action for Chinese Patent Application No. 200780013515.3 (Feb. 23, 2011).

Decision to Grant for Japanese Patent Application No. 2008-555265 (Dec. 5, 2011).

Decision to Grant a European Patent Pursuant to Article 97(1) EPC for European Patent Application No. 07749983.8 (Mar. 14, 2013).

Second Office Action for Chinese Patent Application No. 200780013515.3 (Mar. 6, 2012).

Communication under Rule 71(3) EPC for European Patent Application No. 07749983.8 (Jul. 23, 2012).

Extended European Search Report for European Patent Application No. 07749983.8 (Sep. 2, 2011).

Notice to Grant for Chinese Patent Application No. 200780013515.3 (Oct. 10, 2012).

* cited by examiner

METHODS, SYSTEMS, AND COMPUTER PROGRAM PRODUCTS FOR SELECTIVE LAYER 2 PORT BLOCKING USING LAYER 2 SOURCE ADDRESSES

TECHNICAL FIELD

The subject matter described herein includes methods, systems, and computer program products for implementing layer 2 port blocking. More particularly, the subject matter described herein includes methods, systems, and computer program products for implementing layer 2 port blocking using layer 2 source addresses.

BACKGROUND ART

In layer 2 switching devices, such as Ethernet switches, when a packet or frame is received at a port, a lookup is typically performed in a layer 2 forwarding table. The lookup is performed based on the layer 2 destination address in the frame. If an entry for the destination address is present in the table, the frame may be forwarded to the output port or ports corresponding to the entry. If an entry for the frame is not present in the table, the frame may be flooded on all output ports other than the port on which the frame was received.

Virtual local area networks (VLANs) can be used to limit the layer 2 flooding domain of a frame. For example, if a layer 2 frame includes a VLAN tag, and an entry is not located for the layer 2 destination address of the frame during the forwarding table lookup, the frame may be flooded only to ports that are members of the same VLAN as the VLAN tag identified in the frame.

Another lookup that typically occurs when a frame arrives at a layer 2 packet forwarding device is referred to as a learning phase lookup. During the learning phase, when a frame arrives at a port of a layer 2 switching device, the layer 2 source address in the frame is read. A lookup may be performed in the layer 2 forwarding table using the layer 2 source address to determine whether a forwarding table entry exists for the layer 2 source address. If a forwarding table entry corresponding to the layer 2 source address is not present in the forwarding table, the layer 2 source address is learned by adding it to the forwarding table with forwarding information for the entry set to the port on which the frame was received. This information may be communicated to the other ports in the switch so that packets having layer 2 destination addresses corresponding to the learned source address can be forwarded to the correct port. If the layer 2 source address is already present in the forwarding table, it has already been learned, and the learning phase ends.

In some instances, it may be desirable to implement layer 2 port blocking. For example, it may be desirable to allow ports A and B to communicate with each other but not with port C, even though ports A-C are all members of the same VLAN. One method for implementing such port blocking is to hardwire the layer 2 switching device so that frames from one port only go to ports with which the port is allowed to communicate. Such a solution lacks granularity and flexibility. For example, it may be desirable to allow some packets from port A to be forwarded to port C and to block other packets from being forwarded from port A to port C.

Two other methods for providing layer 2 port blocking are referred to by the assignee of the subject matter described herein as limit learning and MAC lockdown. According to limit learning, a set number of MAC addresses that can be learned is configured on a per VLAN basis. Once that number of MAC addresses has been learned, if a frame arrives with a new MAC source address, a black hole entry is added to the forwarding table for that MAC source address so that any packet received with a MAC destination address corresponding to the black hole entry will be discarded. In the MAC lock down feature, an operator issues a run time command to a layer 2 switch to lock down a layer 2 forwarding table so that no additional entries can be learned after the command. Subsequent MAC addresses that are attempted to be learned are added as black hole entries to the table, so that packets with MAC destination addresses corresponding to the black hole entries will be discarded.

While these security features are each suitable for their intended purpose, there exists a long felt need for improved methods, systems, and computer program products for implementing selective layer 2 port blocking using layer 2 source addresses.

SUMMARY

According to one aspect, the subject matter described herein includes a method for implementing selective layer 2 port blocking using a layer 2 source address. The method includes receiving a layer 2 frame and identifying, based on a layer 2 source address in the layer 2 frame, an I/O port block list. A forwarding phase lookup is performed to identify a set of ports to which the layer 2 frame should be forwarded. Forwarding of the layer 2 frame to ports that are in the set and that are also in the block list is blocked.

The terms "packet" and "frame" are used interchangeably herein and are intended to refer to a protocol data unit sent over a network with at least one header and a payload. The term "layer 2" is intended to refer to the medium access control (MAC) layer of a network communications protocol stack. An example of a layer 2 implementation suitable for use with the subject matter described herein is an Ethernet layer. The term "layer 3" is intended to refer to the network layer of a network communications protocol stack. An example of a layer 3 implementation suitable for use with the subject matter described herein is an Internet protocol layer.

The subject matter described herein for implementing selective layer 2 port blocking based on layer 2 source addresses can be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
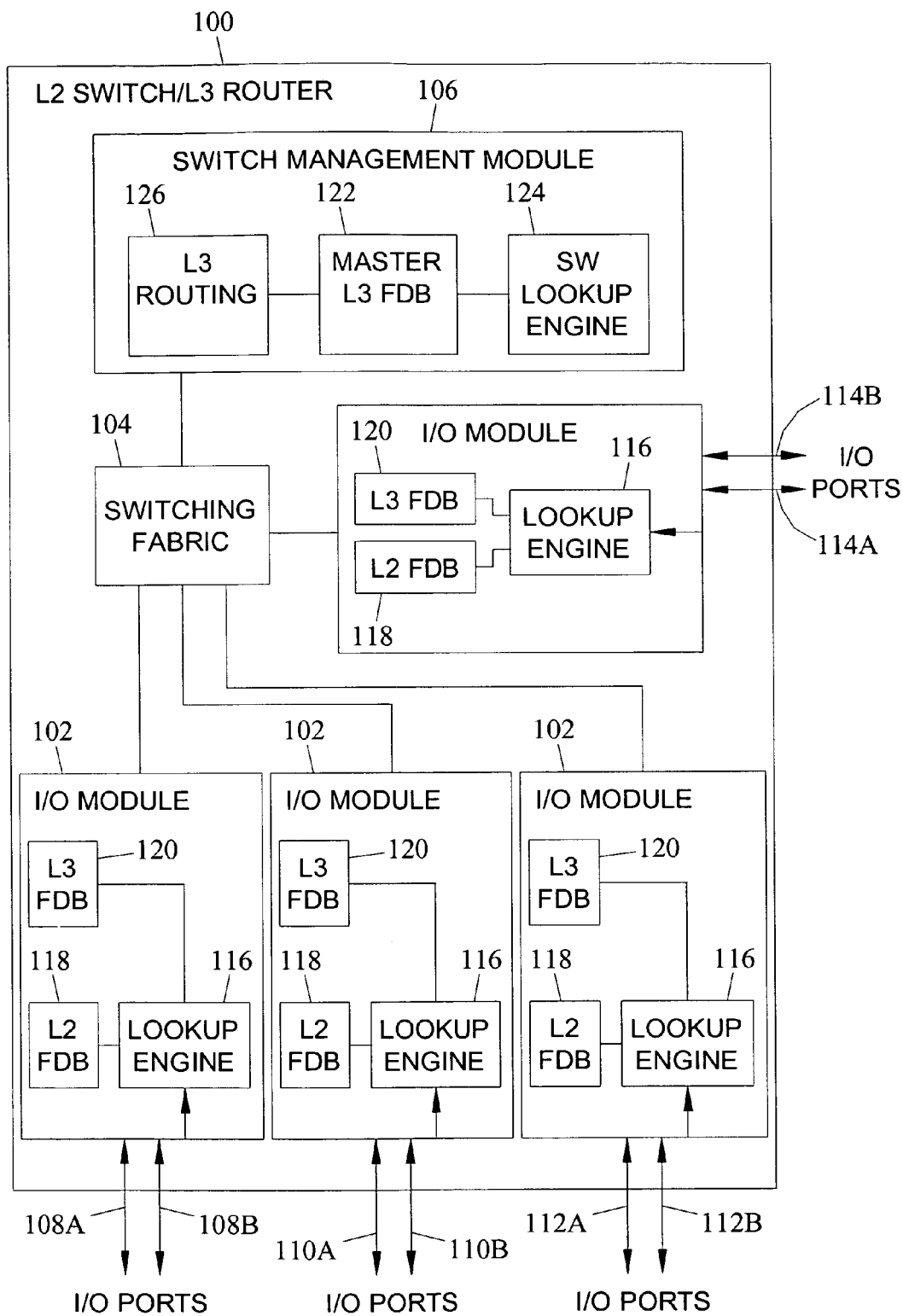
FIG. 1 is a block diagram illustrating a layer 2/layer 3 packet forwarding device for implementing selective layer 2 port blocking based on layer 2 source addresses according to an embodiment of the subject matter described herein.

The subject matter described herein for implementing selective layer 2 port blocking using layer 2 source addresses can be implemented on any suitable processing platform that includes layer 2 switching capabilities. Examples of such platforms include Ethernet switches and IP routers that include Ethernet switching capabilities. FIG. 1 is a block diagram illustrating an example of such a platform on which the subject matter described herein can be implemented. In FIG. 1, layer 2 switch/layer 3 router 100 performs layer 2 switching and layer 3 routing. In the illustrated example, switch/router 100 includes a plurality of input/output (I/O) modules 102, a switching fabric 104, and a switch management module 106. I/O modules 102 each include one or more I/O ports 108A-114B for connecting each I/O module 102 to the external network for sending and receiving packets to and from the network. In order to perform layer 2 and layer 3 packet forwarding, each I/O module 102 includes a lookup engine 116, a layer 2 forwarding database 118, and a layer 3 forwarding database 120. Lookup engine 116 performs lookups in databases 118 and 120 based on layer 2 and layer 3 destination addresses to determine where to forward each received packet. Layer 2 forwarding database 118 includes a table of layer 2 addresses and corresponding forwarding information. Layer 3 forwarding database 120 includes a table of layer 3 addresses and corresponding forwarding information. As will be described in more detail below, layer 2 forwarding database 118 may include, for some entries, I/O port block lists.

Although in FIG. 1, a single lookup engine 116 performs both layer 2 and layer 3 forwarding phase lookups, the subject matter described herein is not limited to such an implementation. In an alternate implementation, the layer 2 and layer 3 lookup engines may be implemented using separate hardware, software, or firmware components.

In addition, although in FIG. 1 separate layer 2 and layer 3 forwarding databases are shown, the subject matter described herein is not limited to such an embodiment. The layer 2 and layer 3 forwarding databases may be implemented as separate tables that are part of the same database without departing from the scope of the subject matter described herein.

Switching fabric 104 switches packets between I/O modules 102 and switch management modules 106. Switch management module 106 includes a master layer 3 forwarding database 122, a software lookup engine 124, and layer 3 routing protocol software 126. Master layer 3 forwarding database 122 includes a copy of all of the entries in layer 3 forwarding databases 120 maintained by the I/O modules plus any additional entries learned using layer 3 routing protocols implemented by software 126. Software lookup engine 124 performs lookups in master layer 3 forwarding database 122 for packets received by I/O modules 102 that cannot be forwarded using the layer 3 forwarding data maintained locally by each I/O module.

In the device illustrated in FIG. 1, it may be desirable to implement selective layer 2 port blocking. For example, it may be desirable to selectively block, on a per layer 2 source address basis, packets from being transmitted between groups of I/O ports illustrated in FIG. 1. In one implementation, I/O ports 108A, 108B, 112A, 112B, 114A, and 114B may be members of the same VLAN. However, it may be desirable to block certain packets arriving on ports 108A and 108B from being forwarded to I/O ports 114A and 114B and to block others from being forwarded to ports 112A and 112B. In order to implement such a requirement, a layer 2 blocking table may be configured on a per source address basis. Table 1 shown below illustrates an exemplary layer 2 forwarding table for implementing selective layer 2 port blocking according to an embodiment of the subject matter described herein.

TABLE 1

Layer 2 Forwarding Data with Source Indexed Port Block Lists

| MAC Address | VLAN | Member Ports | Port Block List |
| --- | --- | --- | --- |
| MAC1 | 5 | 112A, 112B, 114A, 114B | 114A, 114B |
| MAC2 | 5 | 112A, 112B, 114A, 114B | 112A, 112B |
| MAC3 | 5 | 112A, 112B, 114A, 114B | 112A, 112B |

The entries in Table 1 are configured to implement the blocking example described above for selectively blocking packets arriving at ports 108A and 108B from being forwarded to ports 112A, 112B, 114A, or 114B on a per layer 2 source address basis. In Table 1, the first column includes MAC addresses. The entries in this column may be populated as MAC addresses are learned. Some of the entries may be statically configured by the switch operator. The second column includes the VLAN identifier, the third column includes the forwarding information for each entry, and fourth column includes the I/O port block lists.

Figure 2:
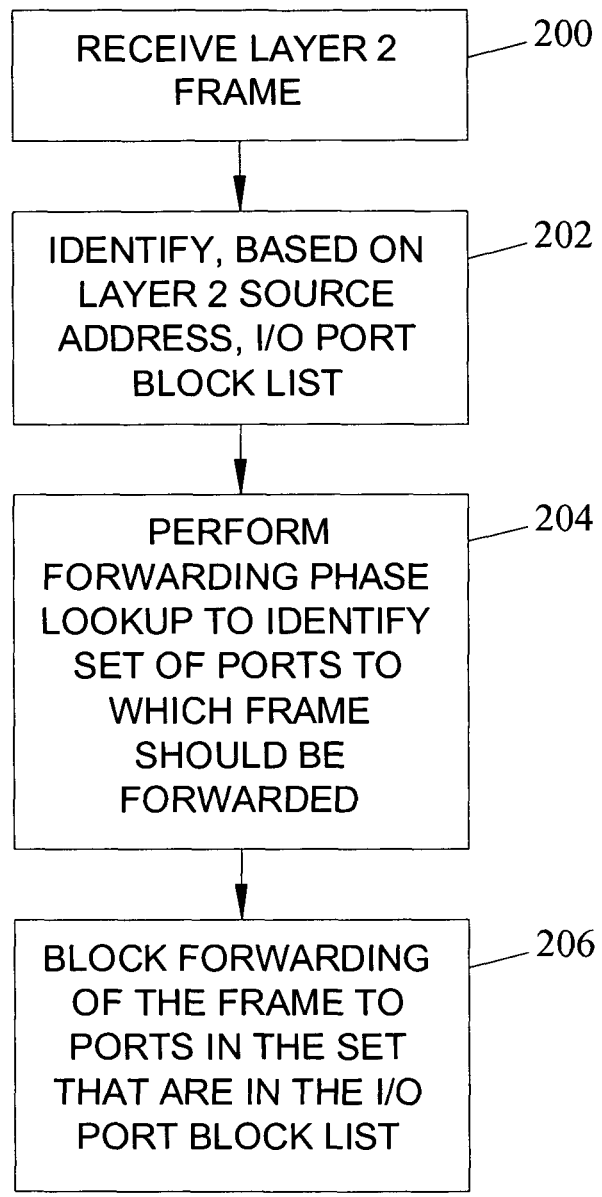
FIG. 2 is a flow chart illustrating exemplary steps for implementing selective layer 2 port blocking using layer 2 source addresses according to an embodiment of the subject matter described herein.

In addition to being used for learning phase lookups, a forwarding table, such as Table 1, may also be used for forwarding phase lookups. For example, if two packets are received at a port that has the data in Table 1, the following steps may occur. Referring to FIG. 2, in step 200, a layer 2 frame is received. For purposes of this example, it will be assumed that the first layer 2 frame has MAC source address (SA)=MAC1, MAC destination address (DA)=MAC2, and a VLAN tag of 5. In step 202, an I/O port block list may be identified based on the layer 2 source address. Using the data in Table 1 as an example, if the MAC SA=MAC1, the I/O port block list extracted will contain ports 114A, 114B.

In step 204, a forwarding phase lookup is performed to identify a set of ports to which the frame should be forwarded. Using MAC DA=MAC2 to perform the lookup in Table 1, the member ports to which the frame should be forwarded are 112A, 112B, 114A, and 114B. In step 204, the frame is blocked from being forwarded to ports in the set that are in the block list. Using the present example, since 114A and 114B are in the block list, the frame will only be forwarded to ports 112A and 112B.

The selectivity of the port blocking can be illustrated by another example where a frame having MAC SA=MAC3, MAC DA=MAC2, and VLAN=5 is received. If such a frame is received, a port block list containing ports 112A and 112B is extracted. The destination address is used to locate the same ports as in the previous example. However, rather than forwarding the frame to ports 112A and 112B, the frame will be forwarded to ports 114A and 114B, because ports 112A and 112B are in the I/O port block list for MAC SA=MAC3. Thus, by using a MAC source address as a discriminator to select a port block list and using that list to determine ports to which a frame should be forwarded, fine grain port blocking can be achieved. In addition, because the I/O port block list can be located in the learning phase lookup, the number of lookups is reduced over layer 2 security applications that require lookups outside of the learning and forwarding phase lookups to implement security features.

Figure 3:
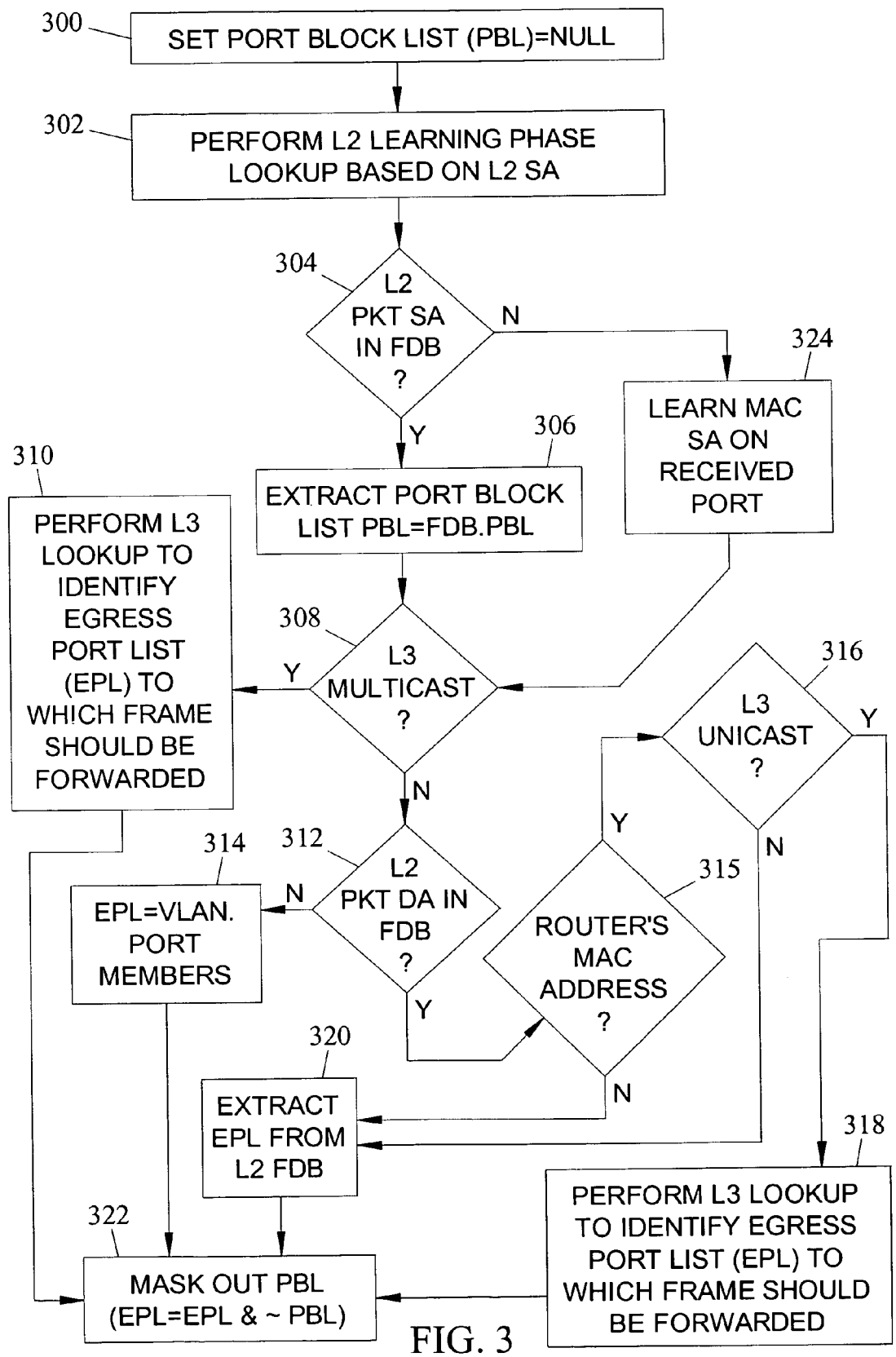
FIG. 3 is a flow chart illustrating exemplary steps for implementing selective layer 2 port blocking for layer 2 and layer 3 packets according to an embodiment of the subject matter described herein.

Although the example described with regard to FIG. 2 is based on limiting the layer 2 forwarding domain of a packet that is forwarded based only on layer 2 information, the subject matter described herein is not limited to such an example. Selective layer 2 port blocking using port blocking lists can be implemented for a set of layer 2 ports that is identified using any protocol, including layer 3 protocols. FIG. 3 is a flow chart illustrating exemplary steps for performing selective layer 2 port blocking based on layer 2 source addresses for layer 2 and layer 3 frames according to an embodiment of the subject matter described herein. Referring to FIG. 3, in step 300, the I/O port block list for a received frame is initially set to null. In step 302, a learning phase lookup is performed based on a layer 2 source address in the received layer 2 frame. As stated above, the layer 2 learning phase lookup may include a lookup in a layer 2 forwarding table at a port on which a frame or packet is received to determine whether an entry corresponding to the layer 2 source address is present. In step 304 if an entry corresponding to the layer 2 source address is present in the forwarding database, learning is not required and control proceeds to step 306 where the I/O port block list corresponding to the packet source address is extracted and stored in a variable referred to as PBL.

In step 308, it is determined whether the packet is a layer 3 multicast packet. Layer 3 multicast packets can be identified by a layer 2 destination address of 0x01005E. If this address is present, the frame is a layer 3 multicast frame, and control proceeds to step 310 where a layer 3 lookup is performed to identify an egress port list (EPL) to which the frame should be forwarded. In step 308, if the frame is determined not to be a layer 3 multicast frame, control proceeds to step 312 where it is determined whether the layer 2 packet destination address is present in the forwarding database. If the layer 2 packet destination address is not present in the forwarding database, control proceeds to step 314 where the egress port list is set to the members of the VLAN associated with the received packet.

In step 312, if the layer 2 packet destination address is in the forwarding database, control proceeds to step 315 where it is determined whether the packet is addressed to the receiving router's MAC address. If the packet is addressed to the router's MAC address, control proceeds to step 316 where it is determined whether the packet is a layer 3 unicast packet. If the packet is a layer 3 unicast packet, control proceeds to step 318, where a layer 3 lookup is performed based on the layer 3 destination address to identify an egress port list to which the frame should be forwarded. In step 315, if the packet is not addressed to the router's MAC address or in step 316, if it is determined that the packet is not a layer 3 unicast packet, control proceeds to step 320 where the egress port list is extracted from the entry in the layer 2 forwarding database entry that matches the layer 2 destination address in the packet.

Once the egress port list is identified in step 310, 314, 318, or 320, control proceeds to step 322 where I/O port block list is used to mask out entries from the egress port list. This step may be implemented using bitmaps that correspond to the egress port list and I/O port block list. The egress port list bitmap may include a 1 corresponding to each port to which the packet should be forwarded and zeros for the remaining ports. Similarly, I/O port block list bitmap may include a 1 for each blocked port and zeros for the remaining ports. Accordingly, in order to produce a bitmap with 1 s for each port to which the frame should be forwarded, I/O port block list bitmap may be bit-inverted and ANDed with the egress port list bitmap. The resulting bitmap includes bits corresponding to ports to which the frame should be forwarded. Using a simple computation, such as a logical AND operation, allows the final egress port list to be identified easily in hardware.

Returning to step 304, if the layer 2 source address is not present in the forwarding database, control proceeds to step 324 where a MAC source address is learned on the received port. Control then proceeds to steps 308 and 310, 312 and 314, or 315-320 where the egress port list is identified and then to step 322 where the list is masked as described above. Thus, using the steps illustrated in FIG. 3, selective layer 2 port blocking can be performed for frames that are forwarded based on layer 2 or layer 3 information.

It will be understood that various details of the invention may be changed without departing from the scope of the invention. Furthermore, the foregoing description is for the purpose of illustration only, and not for the purpose of limitation.

What is claimed is:

1. A method for selective layer 2 port blocking based on a layer 2 source address, the method comprising:
   at a port in a layer 2 switching device:
   (a) storing different I/O port block lists for different layer 2 source addresses within a common VLAN, wherein at least one of the I/O port block lists specifies plural member ports to block within the VLAN based on a frame's layer 2 source address;
   (b) receiving a layer 2 frame;
   (c) identifying, during a layer 2 learning phase lookup and based on a layer 2 source address in the layer 2 frame, an input/output (I/O) port block list from the different I/O port block lists, wherein identifying the I/O port block list includes matching the frame's layer 2 source address with a layer 2 address associated with the I/O port block list;
   (d) performing a forwarding phase lookup to identify a set of ports to which the frame should be forwarded; and
   (e) blocking forwarding of the layer 2 frame to ports in the set that are also in the I/O port block list.

2. The method of claim 1 wherein performing the forwarding phase lookup includes performing a lookup in a layer 2 forwarding table and identifying the set of ports including members of a VLAN corresponding to a VLAN tag in the layer 2 frame.

3. The method of claim 1 wherein performing the forwarding phase lookup includes identifying the packet as a layer 3 multicast packet and performing a lookup in a layer 3 forwarding table to determine the set of layer 2 ports to which the frame should be forwarded.

4. The method of claim 1 wherein performing the forwarding phase lookup includes identifying the frame as a layer 3 unicast frame and performing a lookup in a layer 3 forwarding table to identify the set of ports to which the frame should be forwarded.

5. The method of claim 1 wherein each I/O port block list is represented by a bitmap having bits indicating ports to which the layer 2 frame should not be forwarded, wherein the set of ports identified during the forwarding phase lookup is represented by a bitmap having bits indicating the set of ports to which the layer 2 frame should be forwarded and wherein blocking forwarding of the layer 2 frame to ports in the set that are in the list includes masking the bitmap representing the ports to which the frame should be forwarded using the bitmap representing the I/O port block list.

6. The method of claim 1 wherein the layer 2 frame comprises an Ethernet frame and wherein receiving a layer 2 frame includes receiving the layer 2 frame at an Ethernet switch.

7. The method of claim 1 wherein the layer 2 frame comprises an Ethernet frame with an Internet protocol (IP) payload and wherein receiving a layer 2 frame includes receiving a layer 2 frame at an IP router.

8. A system for selective layer 2 port blocking using a layer 2 source address, the system comprising:
   (a) a forwarding database associated with a layer 2 port and including entries having layer 2 forwarding information, wherein at least two of the entries include input/output (I/O) port block lists indicating ports to which a received layer 2 frame should not be forwarded, wherein the at least two entries correspond to a common VLAN and specify different sets of ports to which a frame within the VLAN should not be forwarded based on a frame's layer 2 source address; and
   (b) a forwarding engine for receiving a layer 2 frame, for locating, during a layer 2 learning phase lookup and based on a layer 2 source address in the layer 2 frame, one of the I/O port block lists, wherein locating the I/O port block list includes matching the frame's layer 2 source address with a layer 2 address associated with the I/O port block list, for determining a set of ports to which the frame should be forwarded, and for blocking forwarding of the frame to ports in the set that are in the I/O port block list located for the frame.

9. The system of claim 8 wherein the forwarding engine is adapted to identify the set of ports to which the frame should be forwarded by performing a lookup in the forwarding database based on a layer 2 destination address in the layer 2 frame.

10. The system of claim 8 wherein the forwarding engine is adapted to identify the frame as a layer 3 multicast frame and to identify the set of ports to which the frame should be forwarded by performing a lookup in a layer 3 forwarding table in the forwarding database.

11. The system of claim 8 wherein the forwarding engine is adapted to identify the frame as a layer 3 unicast frame and to identify the set of ports to which the frame should be forwarded by performing a lookup in a layer 3 forwarding table in the forwarding database.

12. The system of claim 8 wherein each I/O port block list is represented by a bitmap having bits indicating the ports to which the frame should not be forwarded, wherein the set of ports to which the frame should be forwarded is represented by a bitmap having bits indicating the ports to which the frame should be forwarded and wherein the forwarding engine is adapted to implement the blocking by masking the bitmap corresponding to the set of ports to which the frame should be forwarded with the I/O port block list bitmap.

13. The system of claim 8 wherein the forwarding engine comprises a layer 2 forwarding engine and wherein the forwarding database comprises a layer 2 forwarding database.

14. The system of claim 8 wherein the forwarding engine comprises a layer 3 forwarding engine and wherein the forwarding database comprises a layer 3 forwarding database.

15. The system of claim 8 wherein the forwarding engine comprises a layer 2 and layer 3 forwarding engine and wherein the forwarding database includes a layer 2 and a layer 3 forwarding table.

16. A computer program product comprising computer executable instructions embodied in a non-transitory computer readable medium for performing steps comprising:
   at a port in a layer 2 switching device:
      (a) storing different I/O port block lists for different layer 2 source addresses within a common VLAN, wherein at least one of the I/O port block lists specifies plural member ports to block within the VLAN based on a frame's layer 2 source address;
      (b) receiving a layer 2 frame;
      (c) identifying, during a layer 2 learning phase lookup and based on a layer 2 source address in the layer 2 frame, an input/output (I/O) port block list from the different I/O port block lists, wherein identifying the I/O port block list includes matching the frame's layer 2 source address with a layer 2 address associated with the I/O port block list;
      (d) performing a forwarding phase lookup to identify a set of ports to which the frame should be forwarded; and
      (e) blocking forwarding of the layer 2 frame to ports in the set that are also in the I/O port block list.

17. The computer program product of claim 16 wherein performing the forwarding phase lookup includes performing a lookup in a layer 2 forwarding table and identifying the set of ports including members of a VLAN corresponding to a VLAN tag in the layer 2 frame.

18. The computer program product of claim 16 wherein performing the forwarding phase lookup includes identifying the packet as a layer 3 multicast packet and performing a lookup in a layer 3 forwarding table to determine the set of layer 2 ports to which the frame should be forwarded.

19. The computer program product of claim 16 wherein performing the forwarding phase lookup includes identifying the frame as a layer 3 unicast frame and performing a lookup in a layer 3 forwarding table to identify the set of ports to which the frame should be forwarded.

20. The computer program product of claim 16 wherein each I/O port block list is represented by a bitmap having bits indicating ports to which the layer 2 frame should not be forwarded, wherein the set of ports identified during the forwarding phase lookup is represented by a bitmap having bits indicating the set of ports to which the layer 2 frame should be forwarded and wherein blocking forwarding of the layer 2 frame to ports in the set that are in the list includes masking the bitmap representing the ports to which the frame should be forwarded using the bitmap representing the I/O port block list.

21. The computer program product of claim 16 wherein the layer 2 frame comprises an Ethernet frame and wherein receiving a layer 2 frame includes receiving the layer 2 frame at an Ethernet switch.

22. The computer program product of claim 16 wherein the layer 2 frame comprises an Ethernet frame with an Internet protocol (IP) payload and wherein receiving a layer 2 frame includes receiving a layer 2 frame at an IP router.

* * * * *